United States Patent
Ho

(10) Patent No.: US 9,864,506 B2
(45) Date of Patent: Jan. 9, 2018

(54) ELECTRONIC DEVICE AND METHOD FOR REMOVING FOLDERS FROM TOUCH SCREEN OF THE ELECTRONIC DEVICE

(71) Applicant: FIH (HONG KONG) Limited, Kowloon (HK)

(72) Inventor: Wan-Ling Ho, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 244 days.

(21) Appl. No.: 14/716,512

(22) Filed: May 19, 2015

(65) Prior Publication Data

US 2016/0187978 A1    Jun. 30, 2016

(30) Foreign Application Priority Data

Dec. 31, 2014    (TW) ............................. 103146689 A

(51) Int. Cl.
*G06F 3/048*      (2013.01)
*G06F 3/0488*     (2013.01)
*G06F 1/16*       (2006.01)
*G06F 3/0484*     (2013.01)
*G06F 3/0483*     (2013.01)

(52) U.S. Cl.
CPC .......... *G06F 3/0488* (2013.01); *G06F 1/1694* (2013.01); *G06F 3/0483* (2013.01); *G06F 3/0484* (2013.01)

(58) Field of Classification Search
CPC .... G06F 3/016; G06F 3/0488; G06F 3/04817; G06F 1/1694; G06F 3/0484; G06F 3/0483

See application file for complete search history.

(56) References Cited

U.S. PATENT DOCUMENTS

| | | | | |
|---|---|---|---|---|
| 7,173,604 B2 * | 2/2007 | Marvit | .................... | G06F 3/017 345/156 |
| 2009/0265671 A1 * | 10/2009 | Sachs | ...................... | G06F 3/017 715/863 |
| 2011/0179368 A1 * | 7/2011 | King | ................... | G06F 3/04815 715/769 |
| 2012/0036485 A1 * | 2/2012 | Watkins, Jr. | .......... | G06F 1/1626 715/863 |
| 2014/0283142 A1 * | 9/2014 | Shepherd | .............. | G06F 3/0482 726/30 |
| 2014/0304631 A1 * | 10/2014 | Wang | .................... | G06F 3/0488 715/765 |

* cited by examiner

*Primary Examiner* — William Bashore
*Assistant Examiner* — Gregory A Distefano
(74) *Attorney, Agent, or Firm* — ScienBiziP, P.C.

(57) ABSTRACT

In a method for removing folders from a touch screen of an electronic device, a preset triggering operation for activating the folders is detected when performed on the touch screen. An acceleration of the electronic device is obtained in real time by the gravity sensor when the preset triggering operation is detected. The electronic device is determined that whether the electronic device is being shaken based on the obtained acceleration; and the folders are removed from the touch screen, the application icons of the folders are displayed on a desktop of the electronic device when the electronic device is being shaken.

12 Claims, 3 Drawing Sheets

ELECTRONIC DEVICE AND METHOD FOR REMOVING FOLDERS FROM TOUCH SCREEN OF THE ELECTRONIC DEVICE

CROSS-REFERENCE TO RELATED APPLICATIONS

This application claims priority to Taiwanese Patent Application No. 103146689 filed on Dec. 31, 2014, the contents of which are incorporated by reference herein.

FIELD

The subject matter herein generally relates to data display on touch-sensitive screens, and more particularly to removing folders from a touch screen of an electronic device.

BACKGROUND

An electronic device, such as an smart phone or a personal digital assistant (PDA) usually includes one or more folders, and the folders store application icons of the electronic device. When the user wants to remove the folders which enclose the application icons, two traditional methods are provided: removing the folders from the touch screen directly or removing the application icons from the folders one by one before the folders are removed automatically when no application icon is left. However, the application icons can be removed at the same time if the folders are directly removed from the touch screen, and removing the application icons from the folders one by one wastes too much time.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
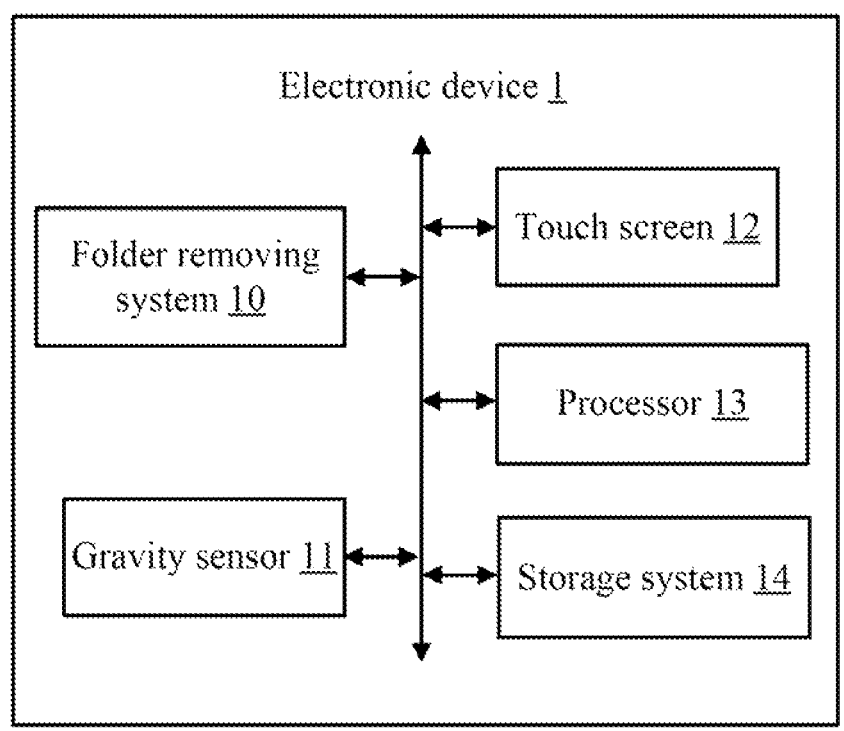
FIG. 1 is a block diagram of an example embodiment of an electronic device including a folder removing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an example embodiment of an electronic device. In at least one embodiment, the electronic device 1 includes a folder removing system 10. The electronic device 1 can be a smart phone, a tablet computer, or a personal digital assistant (PDA), for example, any of which employs a touch screen 12. The electronic device 1 further includes, but is not limited to, a gravity sensor 11, at least one processor 13 and a storage system 14. FIG. 1 illustrates only one example of an electronic device that can include more or fewer components than illustrated, or have a different configuration of the various components in other embodiments.

The gravity sensor 11 is integrated in the electronic device 1, and the gravity sensor 11 can detect an acceleration of the electronic device in real time. The touch screen 12 can be a liquid crystal display (LCD) or an organic light-emitting diode (OLED) display. The touch screen 12 can recognize a touch location of a touch operation by a finger or a stylus. The at least one processor 13 can be a central processing unit (CPU), a microprocessor, or other data processor chip that performs functions of the electronic device 1. The storage system 14 can include various types of non-transitory computer-readable storage media. For example, the storage system 14 can be an internal storage system, such as a flash memory, a random access memory (RAM) for temporary storage of information, and/or a read-only memory (ROM) for permanent storage of information. The storage system 14 can also be an external storage system, such as a hard disk, a storage card, or a data storage medium.

In at least one embodiment, one or more folders are displayed on the touch screen 12 and each of the folders stores at least one application icon. The folders can be activated if a preset triggering operation for activating the folders is performed (e.g. a double-click operation being performed on the folders). When the folders are activated, the folder removing system 10 can obtain any acceleration of the electronic device 1 detected by the gravity sensor 11 in real time, and determine if the electronic device 1 is being shaken based on the obtained acceleration. If the electronic device 1 is being shaken, the folder removing system 10 removes the folders from the touch screen 12 and displays application icons stored in the folders on a desktop of the electronic device 1.

Figure 2:
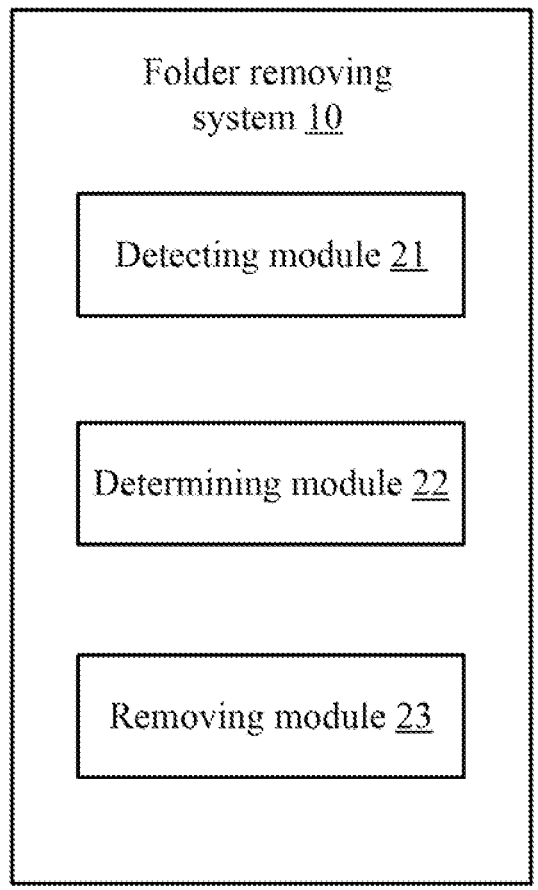
FIG. 2 is a block diagram of an example embodiment of function modules of the folder removing system in FIG. 1.

FIG. 2 is a block diagram of an example embodiment of function modules of the folder removing system in FIG. 1. In at least one embodiment, the folder removing system 10 can include a detecting module 21, a determining module 22, and a removing module 23. The function modules 21-23 can include computerized code in the form of one or more programs, which are stored in the storage system 14 and can be executed by the at least one processor 13 to provide functions of the function modules 21-23.

The detecting module 21 receives instructions presetting a triggering operation performable for activating the folders on the touch screen 12, and detects the preset triggering operation when the preset triggering operation is performed on the touch screen 12. When the preset triggering operation is deleted, the folders can be activated, and the detecting module 21 obtains an acceleration of the electronic device 1 in real time using the gravity sensor 11. In at least one embodiment, the folders can include one or more application icons, the preset triggering operation can include, but is not limited to, a double-click operation performed on the folders or a press operation performed on an application icon of the folders.

The determining module 22 determines whether the electronic device 1 is being shaken based on the obtained acceleration. In at least one embodiment, when the electronic device 1 is being shaken, the obtained acceleration of the electronic device 1 can be changed regularly, for example, the obtained acceleration can be changed back and forth within a preset acceleration value range in a predetermined period. If the obtained acceleration is changed back and forth within the preset acceleration value range in the predetermined period, the determining module 22 can determine that the electronic device 1 is being shaken.

The removing module 23 removes the folders from the touch screen 12, and displays application icons of the folders on a desktop of the electronic device 1 when the electronic device 1 is being shaken.

Figure 3:
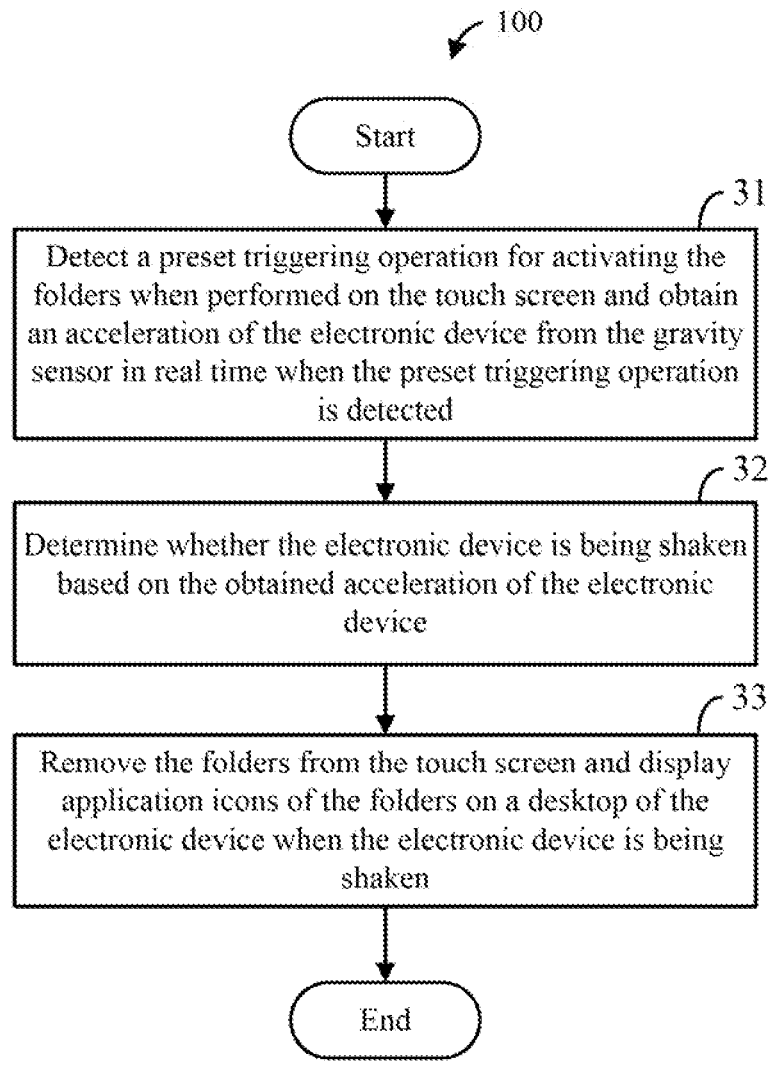
FIG. 3 is a flowchart of an example embodiment of a method for removing folders from a touch screen of the electronic device in FIG. 1.

FIG. 3 illustrates a flowchart of an example embodiment of a method 100 for removing folders from a touch screen of the electronic device of FIG. 1 with a gravity sensor. In at least one embodiment, the method 100 is provided by way of example, as there are a variety of ways to carry out the method. The method 100 described below can be carried out using the configurations illustrated in FIGS. 1-2, for example, and various elements of these figures are referenced in explaining example method. Each block shown in FIG. 3 represents one or more processes, methods, or subroutines, carried out in the exemplary method. Furthermore, the illustrated order of blocks is by example only and the order of the blocks can be changed. The exemplary method can begin at block 31. Depending on the embodiment, additional blocks can be added, others removed, and the ordering of the blocks can be changed.

At block 31, a detecting module receives instructions presetting a triggering operation performable for activating the folders on the touch screen, and detects the preset triggering operation when the preset triggering operation is performed on the touch screen. When the preset triggering operation is deleted, the detecting module obtains an acceleration of the electronic device from the gravity sensor in real time. In at least one embodiment, the folders can include one or more application icons, the preset triggering operation can include, but is not limited to, a double-click operation performed on the folders or a press operation performed on an application icon of the folders.

At block 32, a determining module determines whether the electronic device is being shaken based on the obtained acceleration of the electronic device. In at least one embodiment, when the obtained acceleration is changed back and forth within a preset acceleration value range in a predetermined period, the determining module determines that the electronic device is being shaken.

At block 33, when the electronic device is being shaken, a removing module removes the folders from the touch screen and displays application icons of the folders on a desktop of the electronic device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for removing folders from a touch screen of an electronic device, the method comprising:
   receiving instructions presetting a triggering operation performable for activating the folders on the touch screen, the folders comprising one or more application icons;
   detecting the preset triggering operation performed on the touch screen;
   obtaining an acceleration of the electronic device in real time from a gravity sensor of the electronic device when the preset triggering operation is detected;
   determining whether the electronic device is being shaken based on the obtained acceleration; and
   removing the folders from the touch screen and displaying the application icons of the folders on a desktop of the electronic device when the electronic device is being shaken.

2. The method according to claim 1, wherein the preset triggering operation comprises a double-click operation performed on the folders and a press operation performed on an application icon of the folders.

3. The method according to claim 1, wherein the folders are activated when the preset triggering operation is performed on the touch screen.

4. The method according to claim 1, wherein the electronic device is being shaken when the acceleration of the electronic device is changed back and forth within a preset acceleration value range in a predetermined period.

5. An electronic device, comprising:
   a gravity sensor;
   a touch screen;
   at least one processor; and
   a storage system that stores one or more programs, when executed by the at least one processor, cause the at least one processor to:
   receive instructions presetting a triggering operation performable for activating folders on the touch screen, the folders comprising one or more application icons;
   detect the preset triggering operation performed on the touch screen;
   obtain an acceleration of the electronic device in real time from a gravity sensor of the electronic device when the preset triggering operation is detected;
   determine whether the electronic device is being shaken based on the obtained acceleration; and remove the folders from the touch screen and display the application icons of the folders on a desktop of the electronic device when the electronic device is being shaken.

6. The electronic device according to claim 5, wherein the preset triggering operation comprises a double-click operation performed on the folders and a press operation performed on an application icon of the folders.

7. The electronic device according to claim 5, wherein the folders are activated when the preset triggering operation is performed on the touch screen.

8. The electronic device according to claim 5, wherein the electronic device is being shaken when the acceleration of the electronic device is changed back and forth within a preset acceleration value range in a predetermined period.

9. A non-transitory storage medium having stored thereon instructions that, when executed by a processor of an electronic device, causes the processor to perform a method for removing folders from a touch screen of the electronic device, the method comprising:

receiving instructions presetting a triggering operation performable for activating the folders on the touch screen, the folders comprising one or more application icons;

detecting the preset triggering operation performed on the touch screen;

obtaining an acceleration of the electronic device in real time from a gravity sensor of the electronic device when the preset triggering operation is detected;

determining whether the electronic device is being shaken based on the obtained acceleration; and removing the folders from the touch screen and displaying the application icons of the folders on a desktop of the electronic device when the electronic device is being shaken.

10. The non-transitory storage medium according to claim 9, wherein the preset triggering operation comprises a double-click operation performed on the folders and a press operation performed on an application icon of the folders.

11. The non-transitory storage medium according to claim 9, wherein the folders are activated when the preset triggering operation is performed on the touch screen.

12. The non-transitory storage medium according to claim 9, wherein the electronic device is being shaken when the acceleration of the electronic device is changed back and forth within a preset acceleration value range in a predetermined period.

* * * * *